ACTUATOR CAP FOR SPRAY DISPENSERS

Original Filed April 1, 1964 2 Sheets-Sheet 1

INVENTOR
Philip H. Sagarin
BY
H. Gilmer Lehmann
AGENT

ACTUATOR CAP FOR SPRAY DISPENSERS

Original Filed April 1, 1964 2 Sheets-Sheet 2

INVENTOR.
Philip H. Sagarin
BY
H. Gilbert Schumann
AGENT

United States Patent Office

Re. 26,367
Reissued Apr. 9, 1968

26,367

ACTUATOR CAP FOR SPRAY DISPENSERS

Philip H. Sagarin, Bridgeport, Conn., assignor to Valve Corporation of America, Bridgeport, Conn., a corporation of Delaware Original No. 3,240,397, dated Mar. 15, 1966, Ser. No. 356,463, Apr. 1, 1964. Application for reissue July 18, 1966, Ser. No. 570,118
10 Claims. (Cl. 222—182)

Matter enclosed in heavy brackets [ ] appears in the original patent but forms no part of this reissue specification; matter printed in italics indicates the additions made by reissue.

*ABSTRACT OF THE DISCLOSURE*

*An actuator cap for a spray dispenser, which comprises a stationary cap body somewhat like an inverted cup, having a side finger opening. Within the body is a depress button which can be reached by the finger tip, inserted in said finger opening, and depressed to effect the discharge. The body has a second opening generally opposite the first, through which the discharge occurs.*

This invention relates to actuators for spray or aerosol dispensers, and more particularly to the guard-type actuator cap constructions of such devices.

It sometimes happens, in the packing and shipping of spray or aerosol dispensers, that accidental or inadvertent discharge of the contents of the spray dispenser occurs due to damage of the package, the method of packing and/or the inclusion in the package of small articles such as lipsticks, vials and the like at a location adjacent the operating member of the actuator cap.

If such a small article, or if a sharp or protuberant portion of the package is made to exert a pressure on the operating member (which latter circumstance might be occasioned as a consequence of rough handling, jarring, or damage to the package) there is a great likelihood of undesirable discharge of the spray substance taking place. In the case of an aerosol dispenser of the type comprising a pressurized can or other container, it is possible as a practical matter for virtually the entire contents of the dispenser to be thus inadvertently discharged in consequence of rough handling or damage during shipment, or also improper packaging in preparation for shipment.

An object of the present invention is to provide a novel and improved guard type actuator cap construction for spray device and the like, wherein the likelihood of accidental or inadvertent discharge of the contents of the dispenser is greatly minimized if not wholly eliminated. This is accomplished, in accordance with the invention, by the provsion of an enclosure means which surrounds the operating portion or member of the actuator cap, such enclosure means being so organized and arranged as to admit the finger of a user for the purpose of enabling the latter to operate the actuator member during normal use of the device, but otherwise preventing small adjoining objects such as lipsticks and the like from coming in contact with the actuating member to cause an undesired accidental discharge of the spray substance.

Another object of the invention is to provide an improved actuator cap for spray devices as above set forth and having an effective guard-type enclosure to prevent accidental operation of the actuator member of the cap, wherein the construction enables the said actuator member to be either an integral part of the entire cap structure or else a separate part or piece which is movably and slidably arranged with the stationary cap body part.

Yet another object of the invention is to provide an improved enclosure-type actuator cap construction in accordance with the foregoing, which may be easily economically molded or fabricated as a molded structure of resilient or semi-rigid plastic substance.

A feature of the invention resides in the provision of an improved actuator cap construction of the enclosure type as above characterized, wherein a transverse top wall (functioning as a guard means) covers a major portion of a side recess of the cap body while still permitting the insertion of the user's finger for the purpose of operating the actuating member.

Another feature of the invention resides in the provision of an improved actuator cap construction as above set fourth, wherein a relatively large tapered or semi-conical finger-receiving side recess is provided in the cap body, and wherein the latter includes an upstanding end wall at the inner end of the side recess, meeting with the top guard wall and so constituted that easy and convenient access is had to the actuator member, enabling the latter to be readily operated.

Other features of the invention reside in the provision of an enclosure guard-type cap construction of the kind outlined, which is extremely simple, comprises relatively few parts, and which may be economically fabricated while at the same time providing a sturdy construction which is characterized by reliable operation.

Other features and advantages will hereinafter appear.

In the drawings accompanying this specification, similar characters of reference are used to designated like components throughout the several views, in which.

Figure 5:
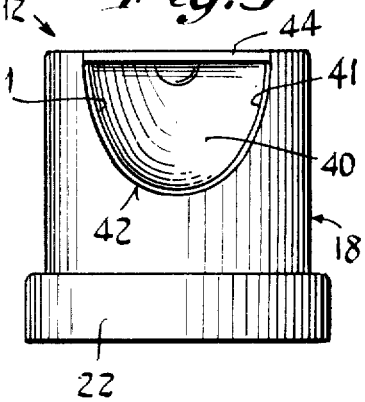
FIG. 5 is a rear elevational view of the actuator cap construction.
Figure 6:
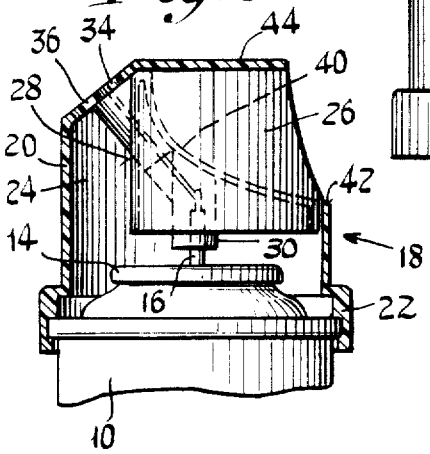
FIG. 6 is a fragmentary vertical axial section of the actuator cap, this figure also showing in elevation an upper portion of a pressurized aerosol dispenser.

Referring first to FIGS. 1–6, there is illustrated a pressurized spray or aerosol type dispenser comprising a cylindrical container 10 which is of a size enabling it to be conveniently held in one hand for the discharge of the pressurized contents. Mounted on the upper portion of the container 10 is a two-piece semi-enclosed guard-type actuator cap construction which is indicated generally by the numeral 12. As seen in FIG. 6, the container 10 includes a top neck and closure portion 14 from which there projects, in an upward direction, a small, hollow vertically movable valve stem 16 through which the pressurized spray substance passes. The discharge of the aerosol substance is effected by shifting downward the valve stem 16 which is normally held in a raised position by a valve return spring located within the container 10 and not shown in the drawings.

The semi-enclosed guard-type actuator cap 12 comprises an outer stationary cap body 18 having a cylindrical wall 20 provided at its lower edge with a mounting flange or skirt 22 adapted to be press-fitted over the upper shoulder portion of the pressurized container 10 for the purpose of mounting the cap construction thereon. The cap body 18 has a cylindrical inner wall surface 24 which provides a bearing for a vertically movable valve stem actuator member or depress button 26, which is provided with cooperable cylindrical wall surfaces for this purpose. The depress button 26 includes a frontal flat wall surface 28 which is disposed toward the front portion of the cap body 18.

Depending from the depress button 26 is a hollow central boss or collar 30 which is adapted to frictionally fit over and seize the upstanding valve stem 16, as seen in FIG. 6. The depress button 26 also has a hollow discharge orifice portion extending angularly upward from the upper front portion at the button, said discharge portion carrying a small orifice disk 34 of usual construction. The orifice 34 is accommodated in a slot 36 of a sloping front wall 38 of the cap body, such sloping wall portion being located at the front of the body as seen in FIGS. 1 and 6.

Figure 1:
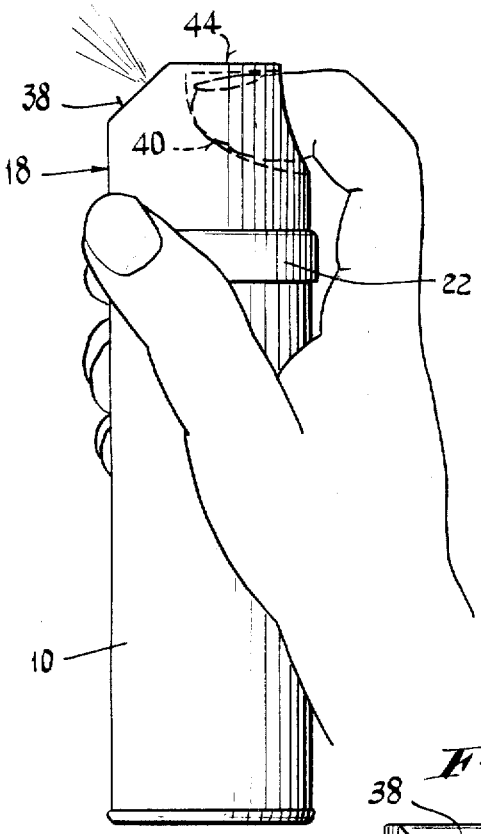
FIG. 1 is a side elevational view of a spray dispenser which is being held in the hand and operated, such dispenser incorporating an improved semi-enclosed guard type actuator cap construction constituted of two separate pieces as provided by the invention, one of said pieces being a stationary outer cap body and the other being an inner, movable actuator or depress button.
Figure 2:
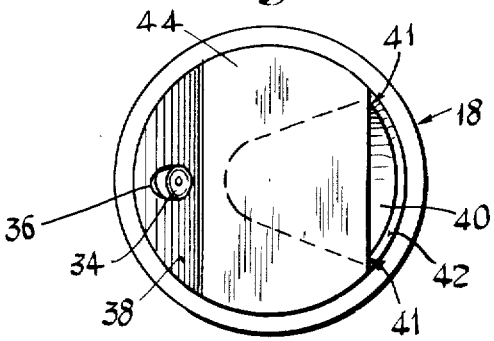
FIG. 2 is a top plan view of the actuator cap construction of FIG. 1.
Figure 3:
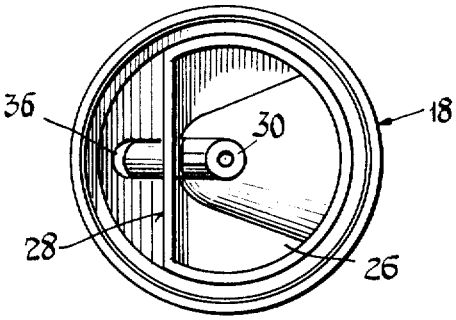
FIG. 3 is a bottom plan view of the actuator cap construction.
Figure 4:
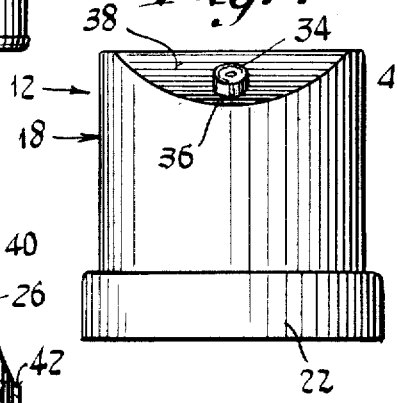
FIG. 4 is a front elevational view of the actuator cap construction.

Referring to FIGS. 2, 5 and 6, the depress button 26 is provided with a deep radial V-shaped finger notch 40 which is so arranged as to accommodate the forefinger of the user's hand, as also shown in FIG. 1. Aligned with the finger-notch 40 of the depress button 26 is a side opening or notch 42 provided in the rear wall of the cap body 18. As clearly shown in FIG. 5, the finger-notch 40 is defined by upstanding oppositely located walls 41.

In accordance with the present invention, the finger-notch 40 of the depress button 26 is made sufficiently deep and full that it can accommodate substantially the entire tip portion of the operating forefinger, as shown in FIG. 1, and the cap body 18 is provided with a transverse top wall 44 constituting a guard means, said top wall extending over the side recess constituted by the finger-notches 40, 42 of the depress button and the cap body respectively. The top guard wall 44 thus overlies the actuator member or depress button 26 of the cap construction and is so organized and arranged as to prevent accidental operation of such actuator member, which might be caused by adjoining small objects such as lipsticks, vials, or by sharp or crushed portions of the package or carton in which the dispenser may be packed and shipped.

As shown in the figures, the transverse top wall 44 at its side peripheral edges is joined to the cylindrical wall 20 of the cap body 18, and is formed to be integral with the cap body at the time that the latter is molded of resilient or semi-rigid plastic substance. The guard wall 44 is also joined to the sloping front wall portion 28 of the cap body to simplify the molding operation, although it will be understood that any other suitable or desirable means of fastening the top wall 44 to the cap body may be utilized.

Referring to FIG. 2 it will be seen that the guard wall 44 covers or encloses a major portion of the side recess constituted by the deep finger-notch 40 of the actuator member or depress button 26, covering substantially more than half of the said side recess as viewed from the top thereof. The top guard wall portion 44 thus is effective in preventing accidental actuation of the depress button, but at the same time the notched side wall of the cap body together with the size and configuration of the V-shaped finger-notch 40 is such as to enable the user's forefinger to be easily and conveniently inserted in the recess, and to actuate or depress the button 26 for the purpose of effecting a discharge. Such actuation is illustrated in FIG. 1.

The semi-enclosed guard-type actuator as above set forth in FIGS. 1–6 is similar in many respects to the guard-type actuator described and claimed in my copending application, Ser. No. 263,984 filed Mar. 8, 1963, *and now Patent No. 3,206,081*, and entitled "Aerosol Dispenser."

Figure 7:
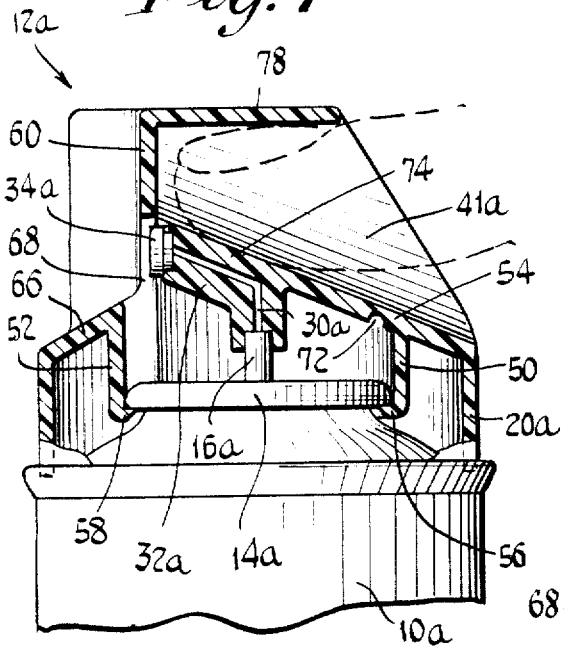
FIG. 7 is a vertical axial sectional view of a semi-enclosed guard-type actuator cap construction as provided by the invention, illustrating another embodiment thereof wherein the entire actuator is constituted as a single piece or part all portions of which are integral with each other with the exception of a small orifice member.
Figure 9:
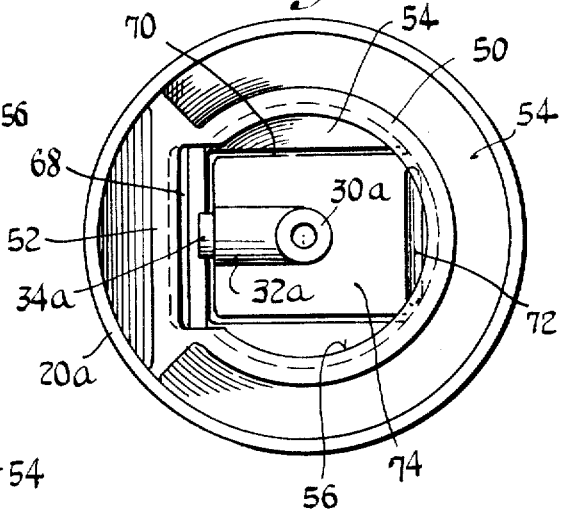
FIG. 9 is a bottom plan view of the one-piece actuator cap.
Figure 8:
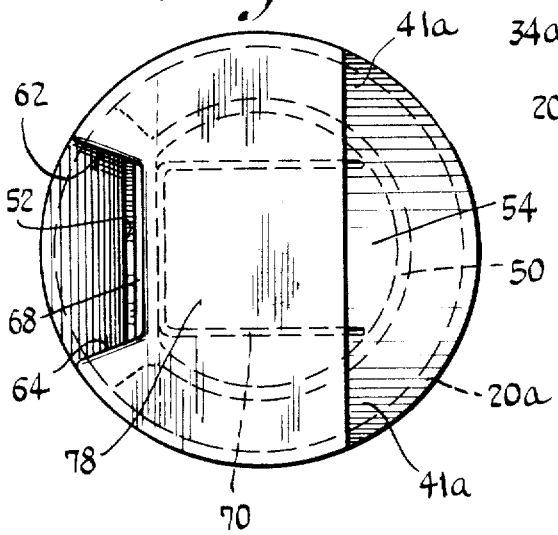
FIG. 8 is a top plan view of the one-piece actuator cap of FIG. 7.

Another embodiment of the invention is illustrated in FIGS. 7–9. This embodiment differs from that of FIGS. 1–6 in that the cap construction is constituted as a single molded piece, fabricated of resilient plastic substance, such molded piece having an inwardly disposed actuator portion which is movable between limits with respect to an outer cap body portion.

A one-piece guard-type actuator cap construction which is in some respects similar to that of FIGS. 7–9 is described and claimed in the copending application of Herbert G. Lehmann, Ser. No. 267,710, filed Mar. 25, 1963, *now Patent No. 3,199,974*, and entitled "Actuator Cap Construction for Aerosol Dispenser," such copending application and the invention described and claimed therein being owned by the assignee of the present invention.

The actuator cap construction of FIGS. 7–9 is designated generally by the numeral 12a and is shown as mounted on a pressurized container 10a having a top shoulder and closure portion 14a, said closure portion having an upstanding depressible hollow valve stem 16a.

The one-piece actuator cap construction 12a comprises an outer cylindrical wall 20a and an inner semi-cylindrical wall 50, the latter being joined to a depending frontal flat wall 52 as seen in FIG. 9.

The cap construction 12a includes an expansive concave finger engageable sloping top wall 54, portions of which connect the depending inner walls 50, 52 to the cylindrical outer wall 20a of the cap. By such connection, the inner walls 50, 52 are rigidly joined to the outer wall 20a and may constitute a mounting means for the cap construction, as by the provision of an internal semicircular bead 56 at the lower edge of the wall 50 and a second straight bead 58 at the lower edge of the wall 52 for engagement with the closure portion 14a of the container 10a.

The cap construction includes an upstanding front wall formation comprising a center upright wall 60 and a pair of oppositely disposed side walls 62 and 64, the latter being joined to the central wall 60 as well as to a frontal sloping wall portion 66 which functions as a connector between the cylindrical outer wall 20a on the one hand and the frontal flat inner wall 52 on the other hand. Below the central front wall portion 60 there is a large opening 68 through which the discharge of the spray substance may pass.

Referring to FIGS. 7 and 8, the concave top wall 54 curves sharply upward at both opposite sides of the cap structure whereby at such sides it constitutes a pair of upstanding oppositely located walls 41a.

A central rectangular portion of the top wall 54 is made in the form of a hinged tab or actuator member, being separated from the remainder of the top wall by a U-shaped slot 70. Extending between the extremities of the slot 70 is a straight groove 72 which provides a weakening of the top wall 54 along a straight line, enabling such weakened portion to function as a hinge means. The central movable portion of actuator member thus formed by the U-shaped slot 70 and groove 72 is indicated by the numeral 74, and depending from such actuator is a hollow boss 30a which is frictionally fitted on the upstanding valve stem 16a. The actuator member 74 also has at its underside an angularly extending hollow discharge portion 32a at the end of which there is carried an orifice disk 34a.

It will be understood that by the above construction a discharge may be effected through the orifice 34a upon the occasion of finger pressure being applied to the top of the actuator member or portion 74 of the cap construction, such finger pressure shifting downward slightly the said member as well as the valve stem 16a.

In accordance with the present invention, a guard-type transverse top wall 78 is provided, extending over the side recess which is formed by the concave top wall structure 54, said guard wall 78 overlying the actuator member 74 to prevent accidental operation thereof by objects disposed at the top of the cap construction. The guard wall 78 as shown in FIG. 8 overlies a major portion of the side recess formed by the curved top wall 54 of the cap, and said guard wall is joined preferably to the upstanding frontal wall 60, as well as to the opposite side walls 62, 64 and to the upper portion of the cylindrical wall 20a of the cap body. The organization is such that the forefinger of the user may be readily inserted without difficulty in the space above the actuator member 74 and below the guard wall 78, as indicated by the dotted outline in FIG. 7. It will be noted from FIG. 7 that the finger space thus provided is of a tapering nature, and that the finger space in FIGS. 1–6 is substantially like that of one-half of a blunt-nosed cone as effected by a theoretical plane which passes axially through the cone.

As seen in FIGS. 7 and 8, the guard means comprising the transverse top wall 78 covers substantially more than one-half of the side recess which admits the finger of the user, spanning the portions of the recess located centrally of the front and rear areas of the cap structure.

It will now be understood from the foregoing that I have provided an advantageous cap construction which may be fabricated either as a single piece or else as two separate pieces, which is characterized by a semi-enclosed finger-receiving side recess, and by a transverse top guard wall arranged to effectively prevent accidental operation of the actuator member by objects disposed at the top of the cap body. The cap construction is sturdy and durable, easy and convenient to use, and may be fabricated readily of resilient plastic substance whereby the cost of manufacture is held to a low figure. The organization is such that the spray dispenser may be safely packaged and shipped with very little likelihood of inadvertent discharge occurring because of the inclusion of other objects in the package, or else because of damage to the package, rough handling, etc.

Figure 10:
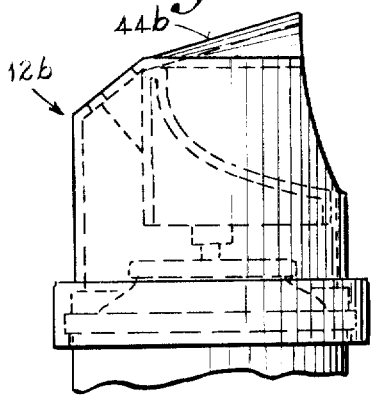
FIG. 10 is a side elevational view of a semi-enclosed guard-type actuator cap construction constituting another embodiment of the invention.

Another embodiment of the invention is illustrated in FIG. 10. This embodiment differs from that of FIGS. 1–6 in that the transverse top wall which extends over the side recess is curved so that its top surface is generally convex. That is, the top wall 44b as seen in FIG. 10 bows upward to have a concave bottom surface and a convex top surface. With the cap construction 12b of FIG. 10 the curved transverse top wall provides more room for the finger of the user, and accordingly the finger notch in the actuator button need not be so deep, but instead may be somewhat shallow, enabling the axial or vertical length of the button to be reduced as compared with the button of FIGS. 1–6. Otherwise, the embodiment of FIG. 10 is similar to that of FIGS. 1–6, and the operation is similar.

Variations and modifications may be made within the scope of the claims, and portions of the improvemnt may be used without others.

I claim:

[1. An actutaor cap for a spray dispenser, comprising in combination:

(a) a cap body and a movable and depressible actuator member therein, said actuator member being adapted for connection to the depressible discharge part of the spray dispenser, (b) said body having a side recess and upstanding oppositely located edges at its sides, which define said recess, (c) means within the sides of the body and including said actuator member, defining a finger-receiving socket which is accessible through the side recess of the body, (d) said actuator member being disposed inwardly of said body recess and constituting a bottom wall of the socket, which bottom wall is accessible by reaching through said recess, (e) said body having a transverse top wall which defines the said socket and which at least in part overlies the actuator member to prevent accidental operation thereof by objects disposed at the top of the cap body, (f) said socket being of a size and depth to readily fully receive the tip portion including the nail of the finger of a user for the purpose of enabling the latter to operate the actuator member without removal of the said transverse top wall, (g) means providing an unobstructed inner end wall in said socket, said end wall having an expanse commensurate with the end of said user's finger and defining the inner end of said socket, (h) said transverse top wall extending from a location adjacent said inner unobstructed end wall to a location adjacent the upstanding recess-defining edges of the cap body and being joined thereto.]

[2. An actuator as in claim 1, wherein:

(a) the cap body and depressible actuator member are molded of resilient plastic and constitute a single integral piece.]

[3. An actuator as in claim 1, wherein:

(a) the cap body and depressible actuator member are constituted as two separate pieces having cooperable bearing surfaces, (b) said actuator member being slidably carried in the cap body.]

[4. An actuator as in claim 1, wherein:

(a) the transverse top wall covers a major portion of the finger-receiving socket.]

[5. An actuator as in claim 1, wherein:

(a) the cap body includes the said unobstructed end wall at the inner end of the said socket, said end wall being joined to the transverse top wall.]

[6. An actuator as in claim 1, wherein:

(a) the actuator member includes the said unobstructed end wall disposed at the inner end of the said socket, (b) said end wall extending closely adjacent the said transverse top wall.]

[7. An actuator as in claim 1, wherein:

(a) the said socket has a configuration substantially like that of one-half of a blunt-nosed cone as effected by a plane passing axially through the cone.]

[8. An actuator as in claim 1, wherein the transverse top wall of the body is curved upward, having a convex top surface and a concave bottom surface, thereby providing additional space above the depressible actuator member.]

[9. An actuator as in claim 1, wherein:

(a) the said socket is of tapered configuration, with its smaller end innermost.]

*10. An actuator cap for a spray dispenser, comprising in combination:*

*(a) a cap body and a movable and depressible actuator member therein, said actuator member being adapted for connection to the depressible discharge part of the spray dispenser,*

*(b) said body having a side opening and upstanding oppositely-located edges at its sides, which define said opening,*

*(c) means within the sides of the body and including said actuator member, defining a finger-receiving space which is accessible through the side opening of the body,*

*(d) said actuator member being disposed inwardly of said body opening and constituting a lower wall of of the finger-receiving space, which lower wall is accessible by reaching through said side opening*

*(e) said body having a tranverse top wall which defines the said finger-receiving space and which at least in part overlies the actuator member to prevent accidental operation thereof by objects at the top of the cap body,*

*(f) said finger-receiving space being of a size and depth to receive the tip portion of the finger of a user for the*

*purpose of enabling the latter to operate the actuator member without removal of the said transverse top wall,*

(*g*) *means providing an unobstructed inner end wall in said finger-receiving space, said end wall having an expanse sufficiently large to engage the end of said user's finger and defining the inner end of said space,*

(*h*) *said transverse top wall extending from a location adjacent said inner unobstructed end wall to a location adjacent the upstanding opening defining edges of the cap body and being joined thereto.*

*11. An actuator cap for a spray dispenser, comprising in combination:*

(*a*) *a cap body and a movable and depressible actuator member therein, said actuator member being adapted for connection to the depressible discharge part of the spray dispenser,*

(*b*) *said body having a side opening and upstanding oppositely-located edges at its sides, which define said opening,*

(c) *means within the sides of the body and including said actuator member, defining a finger-receiving space which is accessible through the side opening of the body,*

(*d*) *said actuator member being disposed inwardly of said body opening and constituting a bottom wall of the finger-receiving space, which bottom wall is accessible by reaching through said side opening,*

(*e*) *said body having a transverse top wall which defines the said finger-receiving space and which at least in part overlies the actuator member to prevent accidental operation thereof by objects disposed at the top of the cap body,*

(*f*) *said finger-receiving space being of a size and depth to readily fully receive the tip portion including the nail of the finger of a user for the purpose of enabling the latter to operate the actuator member without removal of the said transverse top wall,*

(*g*) *means providing an unobstructed inner end wall in said finger-receiving space, said end wall having an expanse commensurate with the end of said user's finger and defining the inner end of said space,*

(*h*) *said transverse top wall extending from a location adjacent said inner unobstructed end wall to a location adjacent the upstanding opening defining edges of the cap body and being joined thereto.*

*12. An actuator as in claim 11, wherein:*

(*a*) *the cap body and depressible actuator member are molded of resilient plastic and constitute a single integral piece.*

*13. An actuator as in claim 11 wherein:*

(*a*) *the cap body and depressible actuator member are constituted as two separate pieces having cooperable bearing surfaces,*

(*b*) *said actuator member being slidably carried in the cap body.*

*14. An actuator as in claim 11, wherein:*

(*a*) *the transverse top wall covers a major portion of the finger-receiving space.*

*15. An actuator as in claim 11, wherein:*

(*a*) *the cap body includes the said unobstructed end wall at the inner end of the said finger-receiving space, said end wall being joined to the transverse top wall.*

*16. An actuator as in claim 11, wherein:*

(*a*) *the actuator member includes the said unobstructed end wall disposed at the inner end of the said finger-receiving space.*

(*b*) *said end wall extending closely adjacent the said transverse top wall.*

*17. An actuator as in claim 11, wherein:*

(*a*) *the said finger-receiving space is of tapered consubstantially like that of one-half of a blunt-nosed cone as effected by a plane passing axially through the cone.*

*18. An actuator as in claim 11, wherein the transverse top wall of the body is curved upward, having a convex top surface and a concave bottom surface, thereby providing additional space above the depressible actuator member.*

*19. An actuator as in claim 11, wherein:*

(*a*) *the said finger-receiving space is of tapered configuration, with its smaller end innermost.*

References Cited

The following references, cited by the Examiner, are of record in the patented file of this patent or the original patent.

UNITED STATES PATENTS

| | | | |
|---|---|---|---|
| 2,577,245 | 12/1951 | Tuttle et al. | 222—182 X |
| 2,621,973 | 12/1952 | Lodes | 222—514 X |
| 2,951,644 | 9/1960 | Mahon et al. | 222—182 X |
| 3,140,014 | 7/1964 | Lerner | 239—337 |
| 3,144,175 | 8/1964 | O'Donnell | 239—337 |

RAPHAEL M. LUPO, *Primary Examiner.*